United States Patent Office 2,984,601
Patented May 16, 1961

2,984,601
PROCESS FOR PREPARING BIOFLAVONOIDS
Jerry M. Sudarsky, Wasco, and Robert A. Fisher, Bakersfield, Calif., assignors, by mesne assignments, to Bioferm Corporation, Wasco, Calif., a corporation of Nevada No Drawing. Filed July 14, 1958, Ser. No. 748,154
6 Claims. (Cl. 195—7)

This invention is directed to a new and useful process for the preparation of bioflavonoids.

Bioflavonoids are in common use for a variety of medical and pharmaceutical purposes and they are commonly derived from citrus fruits and, more particularly, from citrus molasses. Existing processes, which commonly involve dehydration of source materials followed by extraction operations, or which involve precipitation of the bioflavonoids by means of heavy metal compounds, have a number of objections both from the standpoint of handling problems and economic considerations as well as in relation to the quality of the bioflavonoids so produced.

The process of the present invention possesses a number of advantages over existing procedures, notably in simplifying the difficulties in purification techniques which are necessary to the production of the bioflavonoids in substantially pure form, and in certain economies of operation.

In accordance with this invention, the particularly preferred starting raw material from which the bioflavonoids are recovered is citrus molasses, which is a by-product of the citrus fruit canning industry. Citrus molasses is a bitter-tasting brownish syrup which usually contains up to 40% of reducing sugars in addition to small quantities of bioflavonoids as well as other constituents. While citrus molasses represents the especially advantageous source material in relation to which the process of the present invention is applied, it will be understood that it is within the broader aspects of this invention to utilize, as starting materials, other bioflavonoid-containing by-products of citrus operations and from which hesperidin or like materials have been or are removed. The invention will be described in connection with the use of citrus molasses as the starting material although, as indicated, it is not to be so delimited.

In carrying out the process of this invention, to the extent that the citrus molasses contains suspended solids, which will almost invariably be the case, such suspended solids are initially removed. This may conveniently be done by diluting the citrus molasses with warm water to a 50% weight to volume concentration and mixing with small amounts of diammonium phosphate and magnesium sulfate, for instance, 1% of diammonium phosphate and 0.1% magnesium sulfate based on the weight of the citrus molasses. The resulting mixture is adjusted to a pH of 5.5 with aqua ammonia, is then heated to 95–105 degrees C. for about 15 minutes, and is filtered hot on a filter aid bed to provide a clarified liquor for use in subsequent steps of the process. While the above described procedure has been found to be very suitable for effecting clarification of the citrus molasses, it will be understood that any other clarification techniques and procedures can be used so long, of course, as they are not of such character as to destroy or cause undue destruction of the bioflavonoids or the fermentable sugars, or interfere with the carrying out of the remaining steps of the process.

The clarified citrus molasses is next fermented to effect removal of fermentable sugar. The removal of the fermentable sugar is essential, among other purposes, to simplifying the purification steps in the subsequent recovery of the bioflavonoids. While any yeast or bacteria or microorganisms or enzymes can be used which are capable of removing the fermentable sugar from the citrus molasses without adversely affecting the bioflavonoid content, it is especially desirable and advantageous to employ ordinary baker's yeast (*Saccharomyces cerevisiae*) because, among other advantages, it can be recovered from the fermentation as a valuable by-product. The fermentation with baker's yeast can be carried out in accordance with techniques which are, per se, well known in the art (Yeast Technology, John White, John Wiley and Sons, Inc., New York, 1954, chapters 4, 5 and 6). Thus, for instance, the fermentation may be started with a seed consisting of 6% baker's yeast solids and 1.6% monoammonium phosphate, based on the weight of the citrus molasses, the clarified citrus molasses being added in logarithmic increments during the fermentation. The temperature of the fermentation is preferably maintained at about 30 degrees C. and the pH is controlled throughout by the addition of aqua ammonia. Approximately 0.5% nitrogen, based on the weight of the citrus molasses, is used, in the form of aqua ammonia.

At the conclusion of the fermentation, the yeast cells are removed by centrifugation, for example, by conventional yeast separators, and the supernatant yeast cell-free liquor is filtered, it being quite suitable to effect such filtration in an ordinary filter press using a filter aid such as "Celite No. 505" (Johns-Manville Co.) in an amount up to about 12% by weight to volume basis. The fermented, filtered liquor is substantially free of fermented and reducing sugars.

The said fermented citrus molasses liquor is then extracted with a solvent for the bioflavonoids. Normal butanol is the particularly preferred solvent. Other organic solvents may be used for the extraction of bioflavonoids, typical examples of which are ethyl acetate, amyl acetate, and isoamyl alcohol. These latter solvents tend to dissolve more or less of certain fractions of bioflavonoid substances in preference to other fractions, and they are not so satisfactory as n-butanol. The extraction may be carried out in a continuous centrifugal extractor such as that made by Podbielniak, Inc., Chicago, Illinois. The extraction is preferably carried out at a temperature of 20 to 30 degrees C. No particular advantage exists in carrying out the extraction at higher temperatures, for instance up to about 50 degrees C. The extraction advantageously is carried out at a pH in the range of 5.0 to 6.5. The distribution coefficient n-butanol/water at pH 5 and above is 0.62. This distribution coefficient increases to 0.99 at pH 3. It is preferred to carrying out the extraction within the specified limits, however, because below pH 5 the bioflavonoid product extracted tends to contain more of certain insoluble undesirable constituents.

The bioflavonoid-rich organic phase is then washed with water to remove inorganic salts which, if not removed, would result in a high non-combustible ash content in the final product. The biflavonoid-rich organic phase is then concentrated to a syrup in a vacuum evaporator. The syrup is dried to a moisture-free powder in a vacuum dryer. These final two steps are desirably carried out at a temperature of 40 degrees C. or below so as to avoid browning or caramelizing reactions which tend to result in the production of undesirable water-insoluble substances in the final product.

The following example is illustrative of a particularly preferred process in accordance with the present invention. It will be understood that various changes and modifications may be made, in the light of the guiding principles disclosed above, without in any manner departing from the novel teachings provided herein.

Example (a) 12 kilograms of commercial citrus molasses were diluted with warm water to a volume of 24 liters. 120 grams of diammonium phosphate were added to this suspension as a flocculating agent and nutrient for the subsequent yeast fermentation. In addition, 12 grams of magnesium sulphate ($MgSO_4.7H_2O$) were added as a yeast nutrient. The suspension was stirred for 15 minutes at a temperature of 95–105 degrees C. and then filtered hot on a bed of "Hy Flo" filter aid.

(b) 96 liters of water were added to a 150-liter tin lined fermenting vessel which was equipped with a device for distributing air under pressure at the bottom of the fermentor. 192 grams of monoammonium phosphate were dissolved in the water after which 720 grams of baker's yeast on a dried solids basis were suspended in the fermentor. Air was turned into the distributor at the rate of 19 cubic feet per minute per square foot of bottom area. At this time the clarified citrus molasses liquor from part (a) was added on an hourly basis in the following percentages: 10–12–12–15–15–15–15–6. At the end of 3 hours the aeration rate was increased from 19 to 22 cubic feet per minute per square foot of bottom area. During the 8-hour fermentation, the pH was controlled within the range of 5 to 6 by the addition of aqua ammonia. The amount of aqua ammonia required for this neutralization process was equivalent to 0.5% nitrogen based on the weight of the citrus molasses used. At the conclusion of the fermentation the yeast was harvested by centrifugation and was found to total 2576 grams yeast solids. The weight or sugar found to be consumed was 3528 grams. Using the figure of net yeast solids produced of 1856 grams the yeast yield was found to be 52.6% of the sugar consumed. The yeast free fermented liquor was filtered on a bed of No. 505 Celite filter aid to remove any remaining suspended solids. The amount of Celite No. 505 used was equivalent to approximately 0.3% of the weight of the filtrate. The filter cake was washed free of the fermented liquor with approximately 10 liters of water. At this point the filtrate volume was 110 liters. It was found that during the fermentation 20 liters evaporated leaving a final volume of 100 liters which, plus the wash water, equaled 110 liters.

(c) The 110 liters of filtered fermented citrus molasses or part (b) was extracted with 37 liters of water-saturated n-butanol (technical grade). The extraction was carried out at a temperature of 22 degrees C. The pH of the fermented liquor was 6.2. At the conclusion of the extraction the aqueous phase was discarded and the organic phase was washed with approximately 37 liters of water. The water-washed organic phase was then concentrated in a vacuum still to a volume of 1.5 liters. During the distillation water was added at a constant rate in order to take advantage of the boiling point of the butanol-water azeotrope. The rate of water addition was adjusted to maintain turbidity in the concentrating liquor. The distillation was carried out between 29 degrees and 35 degrees C. The concentrated liquor was removed to a vacuum oven in which moisture and solvent were removed at a temperature at below 35 degrees C. until a light tan powder, in the amount of 150 grams, remained. This represented a yield of bioflavonoid equal to 1.25% of the original molasses weight.

The bioflavonoid powder produced in this process had the following characteristics:

(1) Potency: 19.0 units per milligram in water at 282 millimicrons.
(2) Chromatography: Strong, fast, intermediate and slow migrating components when developed in an ascending 10% acidic acid system on Whatman No. 1 filter paper.
(3) Chemical tests: The three chemical tests applied are described on pages 466 to 474 of Modern Methods of Plant Analysis, volume 3, published by Springer-Verlag, Berlin (1955). The ferric chloride test was strongly positive and is characteristic of 3-, 5-, and 8-hydroxy flavones. The magnesium-hydrochloric acid reduction test was strongly positive and indicates the presence of flavonols (and their 3-ethers and glycosides), flavanones and flavanonols. The boric acid test was strongly positive and indicates the presence of flavonols which contain a 35-hydroxyl group.
(4) Ash: Nil.
(5) Solubility: 74.4% in 1% aqueous solution.
(6) pH: 4.2 (1% aqueous solution).
(7) Color: Brown.
(8) Taste: Bitter.
(9) Odor: Characteristic bioflavonoid, free from solvent and other foreign odors.

What is claimed as new and desired to be protected by Letters Patent of the United States is:

1. In a process for preparing bioflavonoids, the steps which comprise providing a clarified bioflavonoid- and fermentable sugar-containing by-product from citrus fruit treatment, fermenting said clarified by-product to effect removal of fermentable sugars, treating said fermented by-product with an organic solvent to extract the bioflavonoids therefrom, and recovering the bioflavonoids from said extract.

2. In a process for preparing bioflavonoids, the steps which comprise providing a clarified bioflavonoid- and fermentable sugar-containing by-product from citrus fruit treatment, fermenting said clarified by-product to effect removal of fermentable sugars, extracting said fermented by-product with n-butanol to provide an n-butanol solution containing the bioflavonoids, and recovering the bioflavonoids from said n-butanol solution.

3. In a process for preparing bioflavonoids, the steps which comprise fermenting clarified citrus molasses by means of Saccharomyces cerevisiae to effect removal of fermentable sugars, extracting the fermented citrus molasses by means of an organic solvent in which the bioflavonoids are soluble, and recovering the bioflavonoids from said organic solvent solution.

4. In a process for preparing bioflavonoids, the steps which comprise fermenting clarified citrus molasses by means of Saccharomyces cerevisiae to effect removal of fermentable sugars, recovering the resulting yeast as a by-product, extracting the fermented citrus molasses with n-butanol, and recovering the bioflavonoids from said n-butanol solution.

5. In a process for preparing bioflavonoids, the steps which comprise fermenting clarified citrus molasses by means of Saccharomyces cerevisiae to effect removal of fermentable sugars, extracting the fermented citrus molasses with water-saturated n-butanol at a pH in the range of 5 to 6.5, washing the resulting bioflavonoid-rich n-butanol phase with water to remove inorganic salts, and recovering the bioflavonoids from said washed n-butanol phase.

6. In a process for preparing bioflavonoids, the steps which comprise clarifying citrus molasses to remove suspended solids therefrom, fermenting said clarified citrus molasses by means of Saccharomyces cerevisiae to effect removal of fermentable sugars, recovering the resulting yeast as a by-product, extracting the fermented citrus molasses with water-saturated n-butanol at a pH in the range of 5 to 6.5, washing the resulting bioflavonoid-rich n-butanol phase with water to remove inorganic salts, and recovering the bioflavonoids from said washed n-butanol phase.

References Cited in the file of this patent

UNITED STATES PATENTS

| | | |
|---|---|---|
| 2,387,635 | Bailey | Oct. 23, 1945 |
| 2,630,432 | Burdick et al. | Mar. 3, 1953 |
| 2,734,896 | Sokoloff | Feb. 14, 1956 |